United States Patent
Qin et al.

(10) Patent No.: US 11,112,039 B2
(45) Date of Patent: Sep. 7, 2021

(54) SLIP SEALING STRUCTURE

(71) Applicant: GUANGZHOU JST SEALS TECHNOLOGY CO., LTD., Guangdong (CN)

(72) Inventors: Zeming Qin, Guangdong (CN); Houning Li, Guangdong (CN); Guangming Huang, Guangdong (CN)

(73) Assignee: GUANGZHOU JST SEALS TECHNOLOGY CO., LTD., Guangzhou (CN)

( * ) Notice: Subject to any disclaimer, the term of this patent is extended or adjusted under 35 U.S.C. 154(b) by 184 days.

(21) Appl. No.: 16/457,931

(22) Filed: Jun. 29, 2019

(65) Prior Publication Data
US 2020/0378533 A1    Dec. 3, 2020

(30) Foreign Application Priority Data

May 30, 2019 (CN) .......................... 201910467575.7
May 30, 2019 (CN) .......................... 201920809829.4

(51) Int. Cl.
*F16L 23/20* (2006.01)
*E21B 33/04* (2006.01)
*E21B 19/10* (2006.01)

(52) U.S. Cl.
CPC .............. *F16L 23/20* (2013.01); *E21B 19/10* (2013.01); *E21B 33/0422* (2013.01)

(58) Field of Classification Search
CPC . F16L 23/00; F16L 23/20; F16L 23/16; F16L 23/18; F16L 23/22; F16L 13/00; F16L 17/00; F16L 19/00; E21B 19/10; E21B 19/102; E21B 3/04; E21B 33/04; E21B 33/0422; E21B 33/1265; E21B 33/129
USPC ........................................................ 277/608
See application file for complete search history.

(56) References Cited

U.S. PATENT DOCUMENTS

| 4,828,293 A | * | 5/1989 | Vanderford, Jr. ... E21B 33/0422 |
| | | | 285/123.6 |
| 4,913,469 A | * | 4/1990 | Baugh ................. E21B 33/0422 |
| | | | 285/123.6 |

FOREIGN PATENT DOCUMENTS

GB        2115160 A  *  9/1983  ............ G01M 3/022

* cited by examiner

*Primary Examiner* — Nathan Cumar

(57) ABSTRACT

A slip sealing structure comprises a cylindrical sealing body comprising an upper and a lower end surfaces, wherein an outer side and an inner side of at least one end surface of the sealing body are provided with an outer metal retaining ring and an inner metal retaining ring respectively, a fabric covering layer is disposed on the at least one end surface, and the outer and inner metal retaining rings are respectively pressed against an outer and inner edges of the fabric covering layer such that the fabric covering layer provides support for the outer and inner metal retaining rings. Through the outer and inner metal retaining rings, compression resistance of the slip sealing structure can be improved, and rubber extrusion at high temperatures and high pressures can be avoided; the fabric covering layer enhances performances of compression resistance and gas explosion resistance of the slip sealing structure.

18 Claims, 2 Drawing Sheets

SLIP SEALING STRUCTURE

CROSS-REFERENCE TO RELATED APPLICATIONS

The present application claims the benefit of Chinese Utility Model Application No. 201920809829.4 filed on May 30, 2019 and Chinese Patent Application No. 201910467575.7 filed on May 30, 2019. The contents of the above are hereby incorporated by reference.

FIELD OF THE INVENTION

The present invention relates to the technical field of sealing parts, in particular to a slip sealing structure.

BACKGROUND OF THE INVENTION

In the drilling operation and oil and gas testing process, a casing head slip hanger, as a basic part of a wellhead assembly, is installed at the upper end of a casing string for suspending the casing string of each casing layer and sealing annular spaces between the casings of two adjacent casing layers. A slip seal is a main seal of the slip-type casing head, and performances thereof directly affect the application range and normal use of the casing head.

Most of the slip seals currently used adopt a structure of annular rubber ring, and are basically used at operating conditions of a low pressure of 5000 PSI and a temperature range of −18° C. to 110° C., which makes these slip seals not meet the operating requirements of slip type casing heads under a higher pressure and a wider temperature range. The reasons lie in that: (1) rubber has a relatively narrow operating temperature range, and physical properties of the rubber will be greatly reduced when the rubber is used in an environment exceeding the temperature range of −18° C. to 110° C.; (2) rubber is prone to gas explosion during high pressure relief, which results in damages of a rubber product; (3) rubber is softened under a high temperature condition, and the softened rubber can easily be extruded from a gap in combination with a high pressure, which results in deformation of the slip seals; and (4) rubber is hardened at a low temperatures and loses its elasticity, which results in a decrease in its sealing performance.

The above factors determine that the currently used rubber slip seals cannot meet the requirements of the slip type casing head under operating conditions of a high pressure of 15000 PSI and a PU temperature range (from −29° C. to 121° C.).

SUMMARY OF THE INVENTION

In order to overcome the deficiencies existed in the prior art, the present invention provides a slip sealing structure which can meet the requirements of a slip type casing head under operating conditions of a high pressure of 15000 PSI and a PU temperature range (from −29° C. to 121° C.).

In order to resolve the technical problem, the present invention provides a slip sealing structure, which comprises a cylindrical sealing body comprising an upper end surface and a lower end surface, wherein an outer side of at least one end surface of the sealing body is provided with an outer metal retaining ring and an inner side of the at least one end surface is provided with an inner metal retaining ring, a fabric covering layer is disposed on the at least one end surface provided with the outer metal retaining ring and the inner metal retaining ring, and the outer metal retaining ring is pressed against an outer edge of the fabric covering layer and the inner metal retaining ring is pressed against an inner edge of the fabric covering layer such that the fabric covering layer provides support for the outer metal retaining ring and the inner metal retaining ring.

As a preferred embodiment, the outer edge and the inner edge of the fabric covering layer are each provided with a step, and the outer metal retaining ring and the inner metal retaining ring are each mounted on the respective steps such that free end surfaces of the outer metal retaining ring and the inner metal retaining ring are flush with the upper end surface or the lower end surface of the sealing body.

As a preferred embodiment, the outer edge and the inner edge of the fabric covering layer are located inside an outer side wall and an inner side wall of the sealing body, respectively.

As a preferred embodiment, an outer side of one end surface of the upper end surface and the lower end surface of the sealing body is provided with a first outer metal retaining ring and an inner side of the one end surface is provided with a first inner metal retaining ring, and a first fabric covering layer is disposed on the one end surface provided with the first outer metal retaining ring and the first inner metal retaining ring.

As a preferred embodiment, an outer side of the upper end surface of the sealing body is provided with the first outer metal retaining ring and the inner side of the upper end surface is provided with the first inner metal retaining ring, and the first fabric covering layer is disposed on the upper end surface provided with the first outer metal retaining ring and the first inner metal retaining ring; an outer side of the lower end surface of the sealing body is provided with a second outer metal retaining ring and an inner side of the lower end surface is provided with a second inner metal retaining ring, and a second fabric covering layer is disposed on the lower end surface provided with the second outer metal retaining ring and the second inner metal retaining ring.

As a preferred embodiment, inside of the sealing body is provided with a plurality of annular fabric reinforcing layers, and the plurality of annular fabric reinforcing layers are stacked along the thickness direction of the sealing body at the same or different intervals.

As a preferred embodiment, each of the fabric reinforcing layers is coaxial with the sealing body.

As a preferred embodiment, the sealing body constitutes a full enclosure around the fabric reinforcing layers.

As a preferred embodiment, the sealing body is made of a rubber material, and vulcanization connection is performed between the sealing body and the fabric covering layer and the fabric reinforcing layers.

As a preferred embodiment, the outer side wall and/or the inner side wall of the sealing body are provided with assembly pattern which has a shape of wave along the thickness direction of the sealing body.

The slip sealing structure provided in an embodiment of the present application has the following beneficial effects: the end surface of the sealing body is designed to be a structure in which the outer metal retaining ring is combined with the inner metal retaining ring, since the metal retaining rings have following features, when the sealing body is pressed tightly by a gland, rubber deformation of the sealing body pushes the metal retaining rings and the metal retaining rings move towards to groove gap, such that fit-up gaps can be reduced to near zero, thus improving performances of compression resistance and gas explosion resistance of the slip sealing structure and avoiding rubber extrusion at high temperatures and high pressures; the fabric covering layer provided on the end surface of the sealing body improves densities of the upper and lower end surfaces of the sealing body, and reduces the release speed of the gas in the sealing body, thus enhancing performances of compression resistance and gas explosion resistance of the slip sealing structure, at the same time, the fabric covering layer also provides a skeleton function when rubber is softened at a high temperature, reduces deformation of a rubber material at high or low temperatures, and improves high and low temperature resistance of the slip sealing structure; and the slip sealing structure according to the present invention can meet the application requirements of the slip casing head under the operating conditions of a high pressure of 15000 PSI and a PU temperature range (from −29° C. to 121° C.).

BRIEF DESCRIPTION OF THE DRAWINGS

In order to more clearly illustrate the technical solutions of the present invention, the drawings to be used in the embodiments will be briefly described below. It is obvious that the drawings in the following description are only some embodiments of the present invention. For those skilled in the art, other drawings can be obtained from these drawings without any creative effort.

Figure 1:
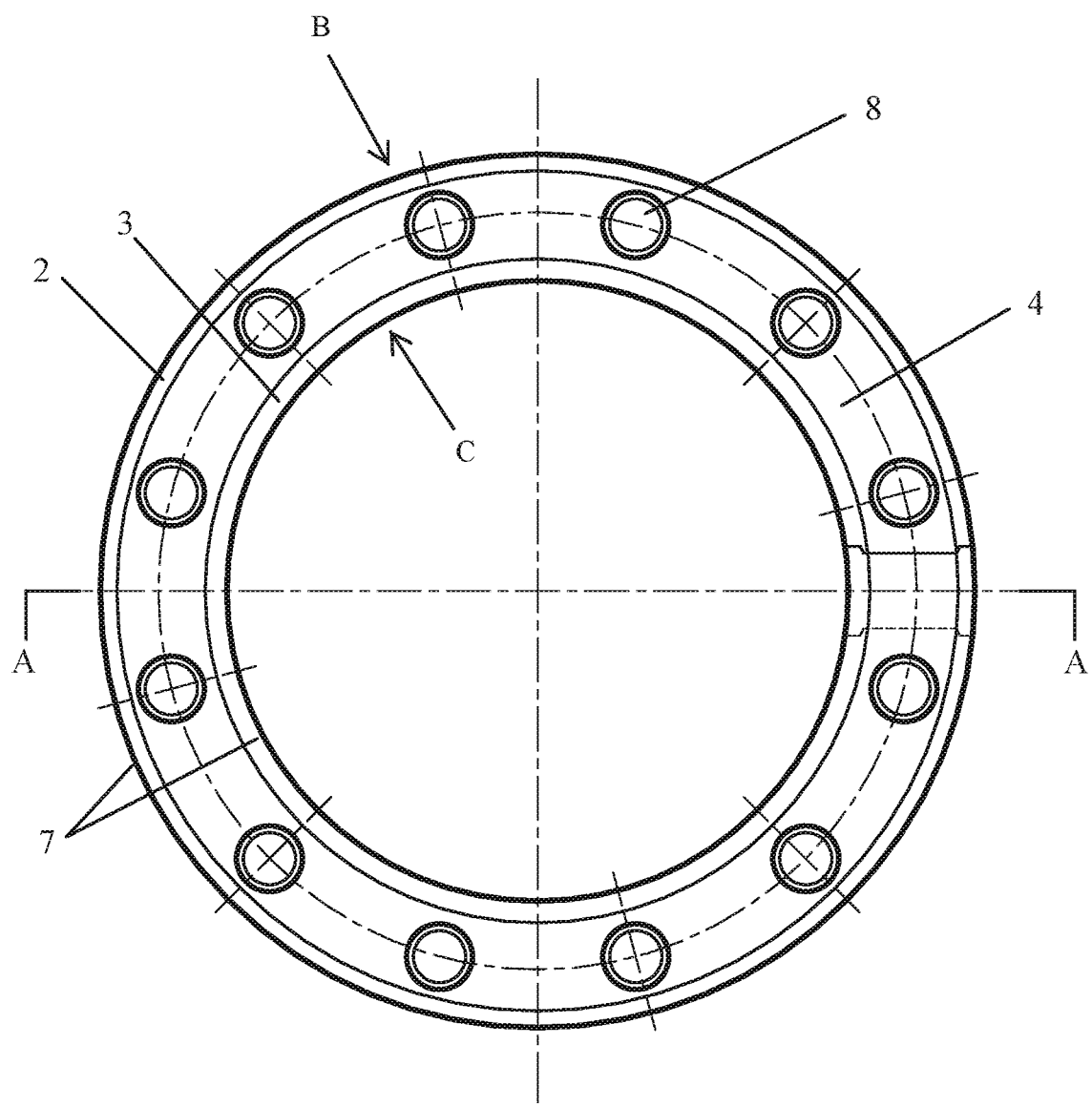
FIG. 1 is a top view of a slip sealing structure according to an embodiment of the present invention.

In the drawings: 1. sealing body; 2. outer metal retaining ring; 21. first outer metal retaining ring; 22. second outer metal retaining ring; 3. inner metal retaining ring; 31. first inner metal retaining ring; 32. second inner metal retaining ring; 4. fabric covering layer; 41. first fabric covering layer; 42. second fabric covering layer; 5. step; 6. fabric reinforcing layer; 7. assembly pattern; 71. outer assembly pattern; 72. inner assembly pattern; 8. assembly hole; B. outer side; B1. outer side of upper end surface; B2. outer side of lower end surface; C. inner side; C1. inner side of upper end surface; C2. inner side of lower end surface; D. outer side wall; E. inner side wall.

DETAILED DESCRIPTION OF PREFERRED EMBODIMENTS

The technical solutions in the embodiments of the present invention will be clearly and completely described in conjunction with the drawings in the embodiments of the present invention. It is obvious that the described embodiments are only a part, not all, of the embodiments of the present invention. In view of the embodiments of the present invention, all other embodiments obtained by those skilled in the art without paying creative efforts are within the protection scope of the present invention.

Figure 2:
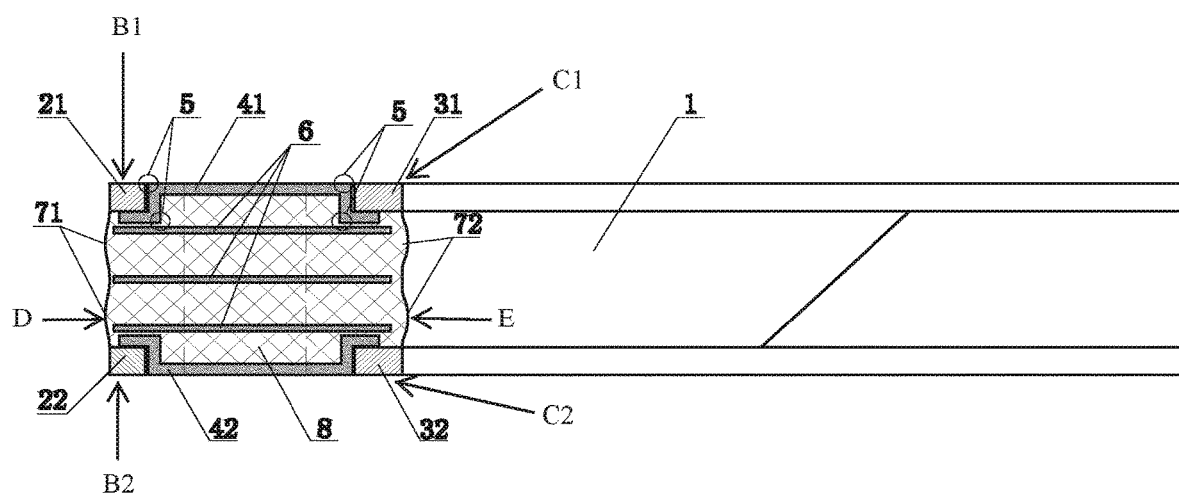
FIG. 2 is a partial schematic view of A-A section of FIG. 1.

Refer to FIGS. 1 and 2, a slip sealing structure provided by a preferred embodiment of the present invention comprises a cylindrical sealing body 1 comprising an upper end surface and a lower end surface, wherein an outer side B of at least one end surface of the sealing body 1 is provided with an outer metal retaining ring 2 and an inner side C of the at least one end surface is provided with an inner metal retaining ring 3, a fabric covering layer 4 is disposed on the at least one end surface provided with the outer metal retaining ring 2 and the inner metal retaining ring 3, and the outer metal retaining ring 2 is pressed against an outer edge of the fabric covering layer 4 and the inner metal retaining ring 3 is pressed against an inner edge of the fabric covering layer 4, such that the fabric covering layer 4 provides support for the outer metal retaining ring 2 and the inner metal retaining ring 3.

In the slip sealing structure with the above technical features, the end surface of the sealing body 1 is designed to be a structure in which the outer metal retaining ring 2 is combined with the inner metal retaining ring 3, since the metal retaining rings have following features, when the sealing body 1 is pressed tightly by a gland, rubber deformation of the sealing body 1 pushes the metal retaining rings and the metal retaining rings move towards to groove gap, such that fit-up gaps can be reduced to near zero, thus improving compression resistance of the slip sealing structure and avoiding rubber extrusion at high temperatures and high pressures; the fabric covering layer 4 provided on the end surface of the sealing body 1 improves densities of the upper and lower end surfaces of the sealing body 1, reduces the release speed of the gas in the sealing body 1, thus enhancing performances of compression resistance and gas explosion resistance of the slip sealing structure, at the same time, the fabric covering layer 4 also provides a skeleton function when rubber is softened at a high temperature, reduces deformation of a rubber material at high or low temperatures, and improves high and low temperatures resistance of the slip sealing structure; and the slip sealing structure according to the present invention can meet the application requirements of the slip casing head under the operating conditions of a high pressure of 15000 PSI and a PU temperature range (from −29° C. to 121° C.).

More preferably, the outer metal retaining ring 2 is made of a stainless steel wire material and is mounted on the outer ring of the sealing body 1 to reduce groove gap and enhance compression resistance of the slip sealing structure. The inner metal retaining ring 3 is made of a stainless steel wire material and is mounted on the inner ring of the sealing body 1 to reduce groove gap and enhance compression resistance of the slip sealing structure.

Further, the sealing body 1 is made of a rubber material. The sealing body 1 is made of a hydrogenated nitrile rubber material, which serves to provide elasticity and sealing. The fabric covering layer 4 is made of a fabric reinforcing material, and vulcanization connection is performed between the sealing body 1 and the fabric covering layer 4. The fabric covering layer 4 is vulcanized and connected to the upper and lower end surfaces of the sealing body 1 to protect the sealing body 1, and enhance performances of compression resistance, gas explosion resistance and high and low temperature resistance of the slip sealing structure.

The outer edge and the inner edge of the fabric covering layer 4 are each provided with a step 5, and the outer metal retaining ring 2 and the inner metal retaining ring 3 are disposed on the respective steps 5, so that the free end surfaces of the outer metal retaining ring 2 and the inner metal retaining ring 3 are flush with the upper or lower end surface of the sealing body 1. The steps 5, as part of the fabric covering layer 4, on the one hand, render the outer metal retaining ring 2 and the inner metal retaining ring 3 flush with the upper or lower end surface of the sealing body 1, on the other hand, enable the fabric covering layer 4 to provide strong support for the first outer metal retaining ring 21 and the first inner metal retaining ring 31, and improve coverage of the fabric covering layer 4 to the sealing body 1.

The outer edge and the inner edge of the fabric covering layer 4 are located in the outer side wall D and inner side wall E of the sealing body 1 respectively, thereby reducing the leakage of the gas inside the sealing body 1 and improving air tightness of the slip sealing structure.

In one embodiment of the present invention, the outer side B1 of the upper end surface of the sealing body 1 is provided with the first outer metal retaining ring 21 and the inner side C1 of the upper end surface is provided with the first inner metal retaining ring 31, and a first fabric covering layer 41 is provided on the upper end surface. Alternatively, the outer side B2 of the lower end surface of the sealing body 1 is provided with the first outer metal retaining ring 21, and the inner side C2 of the lower end surface is provided with the first inner metal retaining ring 31, and the first fabric covering layer 41 is provided on the lower end surface.

As shown in FIG. 2, in another embodiment of the present invention, the outer side B1 of the upper end surface of the sealing body 1 is provided with the first outer metal retaining ring 21 and the inner side C1 of the upper end surface is provided with the first inner metal retaining ring 31, and the first fabric covering layer 41 is disposed on the upper end surface provided with the first outer metal retaining ring 21 and the first inner metal retaining ring 31; the outer side B2 of the lower end surface of the sealing body 1 is provided with a second outer metal retaining ring 22 and the inner side C2 of the lower end surface is provided with a second inner metal retaining ring 32, and a second fabric covering layer 42 is disposed on the lower end surface provided with the second outer metal retaining ring 22 and the second inner metal retaining ring 32. By a structure in which the upper and lower end surfaces of the sealing body 1 are designed to be combined with the outer metal retaining ring 2 and the inner metal retaining ring 3, the compression resistance of the slip sealing structure is greatly improved and rubber extrusion at high temperatures and high pressures is avoided.

The inside of the sealing body 1 is provided with a plurality of annular fabric reinforcing layers 6 which are stacked along the thickness direction of the sealing body 1 at the same or different intervals. The fabric reinforcing layers 6 are made of a reinforcing fabric material, and are vulcanized and connected to rubber rings on the sealing body. The fabric reinforcing layers 6 are disposed inside of the sealing body 1 to enhance performances of compression resistance, gas explosion resistance and high and low temperatures resistance of the slip sealing structure.

Further, the slip sealing structure is provided with a plurality of assembly holes 8 distributed in an annular array. The plurality of assembly holes 8 respectively penetrate through the slip sealing structure along the thickness direction of the sealing body 1, that is, the plurality of assembly holes 8 sequentially penetrate through the first fabric covering layer 41, the upper end surface of the sealing body 1, the fabric reinforcing layers 6, the lower end surface of the sealing body 1, and the second fabric covering layer 42.

The slip seal structure of the present embodiment is provided with a plurality of fabric reinforcing layers 6, while in the prior art, no fabric layers are provided inside seal members. Since the inside of the sealing body 1 is provided with the fabric reinforcing layers 6, the structure of the sealing body 1 is stabilized, and the inner fabric layers gradually reduce the penetration force of pressure gas, and also reduce the releasing speed of gas inside the sealing part, thereby enhancing the compression resistance and gas explosion resistance of the slip seal structure. The fabric reinforcing layers 6 also provide a skeleton function for the sealing body 1 when the rubber material is softened at a high temperature, reduce deformation of the rubber material at high and low temperatures, and improve the high and low temperature resistance of the slip sealing structure.

In the present embodiment, the fabric reinforcing layers 6 are each coaxial with the sealing body 1 to ensure structural stability of the slip sealing structure.

The sealing body 1 constitutes a full enclosure around the fabric reinforcing layers 6, thereby reducing leakage of gas inside the sealing body 1, and improving air tightness of the slip sealing structure.

The outer side wall D and/or the inner side wall E of the sealing body 1 are provided with assembly pattern 7 which is in a shape of wave along the thickness direction of the sealing body 1. The assembly pattern 7 includes an outer assembly pattern 71 disposed on the outer side wall D of the sealing body 1 and an inner assembly pattern 72 disposed the inner side wall E of the sealing body 1. The outer assembly pattern 71 and the inner assembly pattern 72, as part of the sealing body 1, serve to improve sealing performance of the slip sealing structure. The side surface of a seal in the prior art generally has a smooth circular arc, and has no wave-shaped assembly pattern. The seal in the prior art belongs to face sealing, and has a dispersed sealing force. Especially, the sealing performance is poor at high and low temperatures. The sealing body 1 of the present embodiment is provided with a wave-shaped assembly pattern on the inner and outer side walls thereof to play a linear sealing effect, and the sealing force is concentrated, thereby improving the sealing performance of the slip sealing structure.

The slip sealing structure of the invention has the following significant advantages over the prior art: (1) the slip sealing structure has good compression resistance and can be used at a high pressure up to 15000 PSI; (2) the slip sealing structure has a wide operating temperature range which can reach PU (from −29° C. to 121° C.); (3) the slip sealing structure has good gas explosion resistance, and has no gas explosion damage after used under the operating conditions of 15000 PSI PU (from −29° C. to 121° C.), without any damage; and (4) the slip sealing structure passes the PU temperature grade test of casing head and obtains certification. Therefore, the slip seal structure of the present invention has a very advantageous application prospect.

Finally, it should be noted that the above embodiments are used only to illustrate the technical solution of the present invention, not to limit it. Although the present invention has been described in detail with reference to the above embodiments, those skilled in the art should understand that the technical solutions described in the above embodiments may be modified, or some of the technical features thereof may be equivalently substituted. These modifications or substitutions do not divorce the essence of the corresponding technical solutions from the spirit and scope of the technical solutions of various embodiments of the present invention.

What is claimed is:

1. A slip sealing structure, wherein the slip sealing structure comprises a cylindrical sealing body comprising an upper end surface and a lower end surface, an outer side of at least one end surface of the cylindrical sealing body is provided with an outer metal retaining ring and an inner side of the at least one end surface is provided with an inner metal retaining ring, a fabric covering layer is disposed on the at least one end surface provided with the outer metal retaining ring and the inner metal retaining ring, and the outer metal retaining ring is pressed against an outer edge of the fabric covering layer and the inner metal retaining ring is pressed against an inner edge of the fabric covering layer such that the fabric covering layer provides support for the outer metal retaining ring and the inner metal retaining ring.

2. The slip sealing structure according to claim 1, wherein the outer edge and the inner edge of the fabric covering layer are each provided with a step, and the outer metal retaining ring and the inner metal retaining ring are each mounted on the respective steps such that free end surfaces of the outer metal retaining ring and the inner metal retaining ring are flush with the upper end surface or the lower end surface of the cylindrical sealing body.

3. The slip sealing structure according to claim 2, wherein the outer edge and the inner edge of the fabric covering layer are located inside an outer side wall and an inner side wall of the cylindrical sealing body, respectively.

4. The slip sealing structure according to claim 3, wherein an outer side of one end surface of the upper end surface and the lower end surface of the cylindrical sealing body is provided with a first outer metal retaining ring and an inner side of the one end surface is provided with a first inner metal retaining ring, and a first fabric covering layer is disposed on the one end surface provided with the first outer metal retaining ring and the first inner metal retaining ring.

5. The slip sealing structure according to claim 3, wherein an outer side of the upper end surface of the cylindrical sealing body is provided with a first outer metal retaining ring and an inner side of the upper end surface is provided with a first inner metal retaining ring, and a first fabric covering layer is disposed on the upper end surface provided with the first outer metal retaining ring and the first inner metal retaining ring; an outer side of the lower end surface of the cylindrical sealing body is provided with a second outer metal retaining ring and an inner side of the lower end surface is provided with a second inner metal retaining ring, and a second fabric covering layer is disposed on the lower end surface provided with the second outer metal retaining ring and the second inner metal retaining ring.

6. The slip sealing structure according to claim 1, wherein inside of the cylindrical sealing body is provided with a plurality of annular fabric reinforcing layers, and the plurality of annular fabric reinforcing layers are stacked along the thickness direction of the cylindrical sealing body at the same or different intervals.

7. The slip sealing structure according to claim 6, wherein each of the fabric reinforcing layers is coaxial with the cylindrical sealing body.

8. The slip sealing structure according to claim 7, wherein the cylindrical sealing body constitutes a full enclosure around the fabric reinforcing layers.

9. The slip sealing structure according to claim 6, wherein the cylindrical sealing body is made of a rubber material, and vulcanization connection is performed between the cylindrical sealing body and the fabric covering layer and the fabric reinforcing layers.

10. The slip sealing structure according to claim 1, wherein an outer side wall of the cylindrical sealing body and/or an inner side wall are provided with assembly pattern which is in a shape of wave along the thickness direction of the cylindrical sealing body.

11. The slip sealing structure according to claim 2, wherein an outer side wall of the cylindrical sealing body and/or an inner side wall are provided with assembly pattern which is in a shape of wave along the thickness direction of the cylindrical sealing body.

12. The slip sealing structure according to claim 3, wherein the outer side wall of the cylindrical sealing body and/or the inner side wall are provided with assembly pattern which is in a shape of wave along the thickness direction of the cylindrical sealing body.

13. The slip sealing structure according to claim 4, wherein the outer side wall of the cylindrical sealing body and/or the inner side wall are provided with assembly pattern which is in a shape of wave along the thickness direction of the cylindrical sealing body.

14. The slip sealing structure according to claim 5, wherein the outer side wall of the cylindrical sealing body and/or the inner side wall are provided with assembly pattern which is in a shape of wave along the thickness direction of the cylindrical sealing body.

15. The slip sealing structure according to claim 6, wherein an outer side wall of the cylindrical sealing body and/or an inner side wall are provided with assembly pattern which is in a shape of wave along the thickness direction of the cylindrical sealing body.

16. The slip sealing structure according to claim 7, wherein an outer side wall of the cylindrical sealing body and/or an inner side wall are provided with assembly pattern which is in a shape of wave along the thickness direction of the cylindrical sealing body.

17. The slip sealing structure according to claim 8, wherein an outer side wall of the cylindrical sealing body and/or an inner side wall are provided with assembly pattern which is in a shape of wave along the thickness direction of the cylindrical sealing body.

18. The slip sealing structure according to claim 9, wherein an outer side wall of the cylindrical sealing body and/or an inner side wall are provided with assembly patterns which are in a shape of wave along the thickness direction of the sealing body.

* * * * *